May 25, 1943.　　　R. H. WALKER　　　2,319,895

TURRET

Filed Sept. 16, 1941　　　3 Sheets-Sheet 1

INVENTOR.
Ralph H. Walker
BY Everett E. Kent
ATTORNEY.

INVENTOR.
Ralph H. Walker
BY Everett E Kent
ATTORNEY

May 25, 1943.  R. H. WALKER  2,319,895
TURRET
Filed Sept. 16, 1941  3 Sheets-Sheet 3
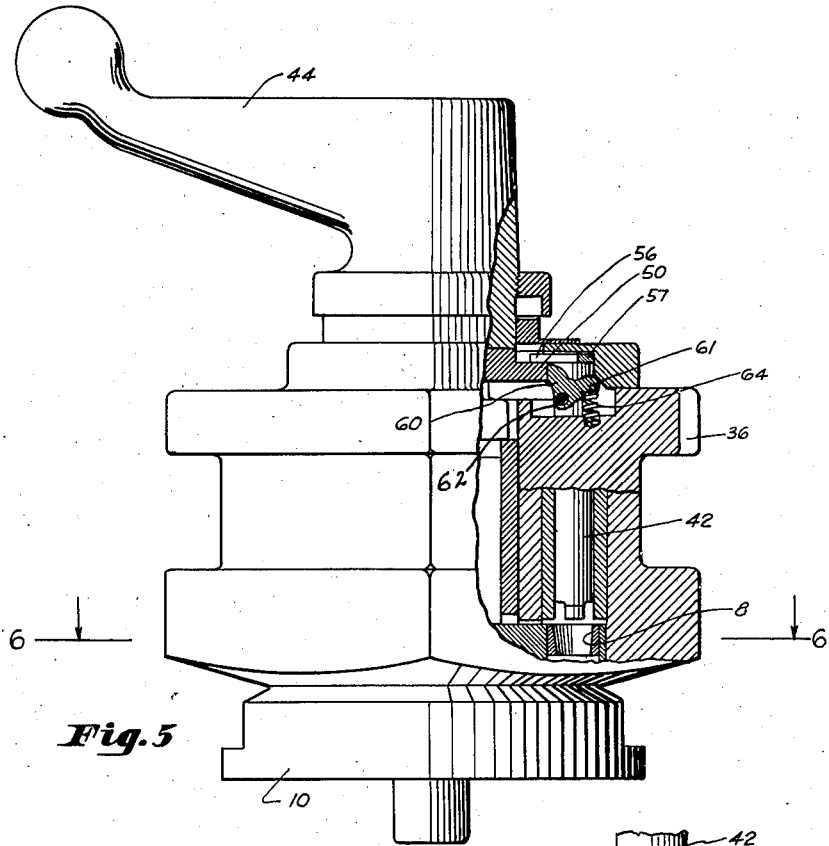
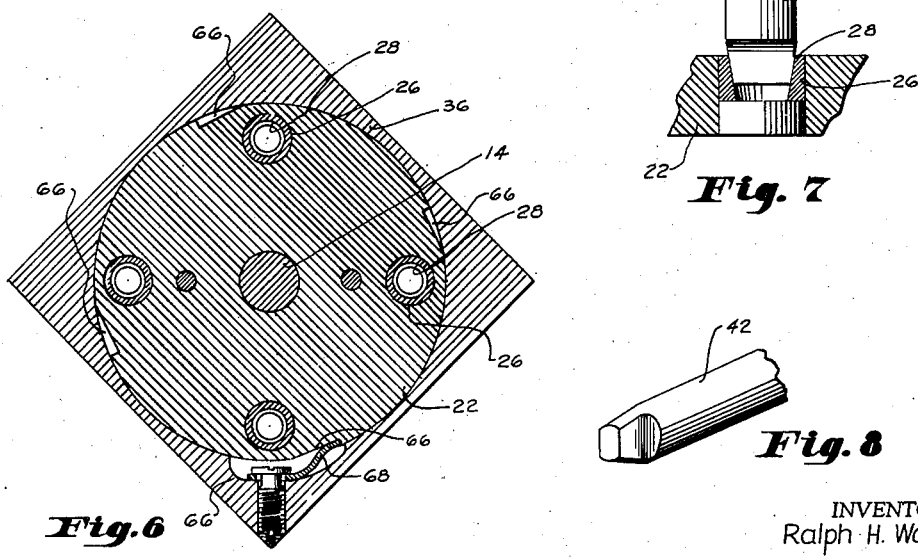
INVENTOR.
Ralph H. Walker
BY Everett T. Kent
ATTORNEY

Patented May 25, 1943

2,319,895

UNITED STATES PATENT OFFICE 2,319,895

TURRET

Ralph H. Walker, Saugus, Mass., assignor to Lawson Machine and Tool Co., Malden, Mass., a corporation of Massachusetts Application September 16, 1941, Serial No. 411,009

4 Claims. (Cl. 29—49)

This invention relates to improvements in turrets.

More particularly it provides for the attainment of high precision in the indexing of tool-holding or work-holding turrets in lathes and other machines.

The purpose is to attain automatically a higher degree of precision than has been found attainable in apparatus of this class heretofore known, and to do this with certainty and with rapidity.

To this end the invention comprises a combination of mechanism in which a manually-controlled turret-turning device automatically unlocks the turret, in preparation for the turning; and an automatic locking of the turret, when the predetermined index position is reached, automatically disconnects the manual control. By reason of the manual control of propulsion, the movement of the turning turret can be slow, as the index station is being reached. Thus the shock and ultimate looseness which are experienced in spring-actuated propulsions can be avoided; and, with great accuracy, the automatic centering of the turret face at the new index station is executed simultaneously with the locking in this centering.

Thereby, so far as the setting of centers is concerned, turret lathes are made available for quantity production of machined parts having dimensions that are identical within tolerances of a few ten-thousandths of an inch, such as are now required for aeroplane engines and other apparatus.

Another object is to employ mechanism which is very simple, as compared with prior proposals, for effecting the said releasing, turning and locking of the turret, to set successive faces in the working position.

The invention is applicable with turrets having any suitable desired number of turret faces; and the axis of the turret is not necessarily vertical.

For attaining these objects and other advantageous results the turret head is mounted suitably for rotation about an axis, this axis being vertical in the style of mounting herein illustratively shown. The spindle has a fixed horizontal base flange with a circular series of vertical conical sockets or "keepers" therein for reception of a locking bolt vertically disposed in the rotatable turret at the edge of the circular plate next below mentioned, the bolt being spring-pressed downward. There is a conical "keeper" in the fixed flange for each tool face of the turret; and the angular position of the keeper determines the index position of the face.

A circular horizontal plate loose on the upper portion of the fixed spindle, and mounted thereon with long screw pitch, so that it rises or falls a considerable distance in a half revolution or so, has its rim engaged under the head of the said vertical bolt. A manual turning of the plate a few degrees, by a handle which is provided, lifts or lowers the plate, so that the plate lifts the bolt out of any "keeper" in which it may be, in the spindle flange or descends so that it does not oppose the bolts descending against the plate, or into any keeper. The plate has a ratchet edge, and there may conveniently be one notch for each index position, the notches being adapted to be engaged by a spring-pressed pawl which is mounted in the revoluble turret head beside the bolt, with its tail under the bolt head. The pawl tends, by its spring, to engage the notched edge of the ratchet plate on the handle, and so constitutes a one-way clutch for propelling the turret forward; but the head of the bolt prevents such engagement except when the bolt head is raised to a height corresponding to a withdrawal of the bolt from its keeper, caused by an anti-clockwise turning of the handle. After the plate has turned far enough for a notch a pass the pawl, clockwise turning of the handle results in notch-engagement of the ratchet plate with the pawl, and consequent carrying of the pawl and turret head clockwise around with the handle. This lowers the plate so that the bolt descends to and rides on the top surface of the spindle flange until it reaches a "keeper" in the flange, when it is snapped thereinto by its spring, thus locking the head against rotation. Simultaneously, the downward snap of the bolt head depresses the tail of the pawl and so swings the pawl out of engagement with the ratchet plate, so that propulsion ceases; and further rotation of the handle on its screw merely effects a tight clamping of the parts together with the advanced face of the head in precision setting.

Notches in the periphery of the spindle flange cooperate with a spring-pressed pin in the turret head to prevent counter-clockwise rotation of the turret head.

It is intended that the patent shall cover, by suitable expression in the appended claims, whatever features of patentable novelty exist in the invention disclosed.

The accompanying drawings illustrate the invention by showing an embodiment thereof, to which however the patent is not limited except as the accompanying claims may indicate.

Figure 5 is a similar view with the handle moved another 90° counter-clockwise, showing the bolt clear of the "keeper" and the pawl engaging the ratchet plate on the handle, this being the limit of counter-clockwise travel of the handle, and the parts being set for clockwise movement of the handle to advance the turret head;

Figure 6 is a top plan in section on 6—6 of Figure 5;

Figure 7 is a detail section on 7—7 of Figure 3; and

Figure 8 is a perspective of the lower end of the locking bolt.

Figure 1:
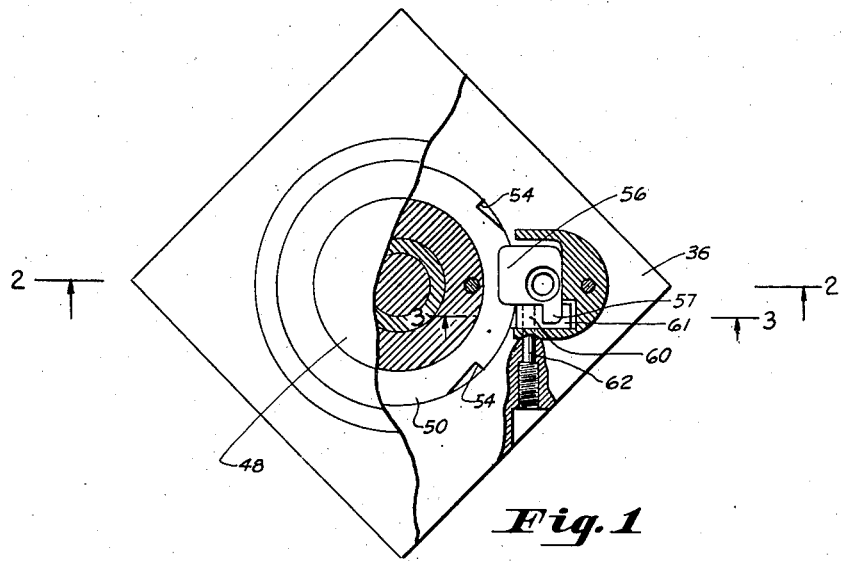
Figure 1 is a top plan of a turret head for a lathe, embodying features of the invention, parts being broken away on 1—1 of Figure 2, for clearness of showing.

Referring to the drawings, the base 10 is adapted for securement to a usual compound base or saddle (not shown) of a lathe, as by screws which may extend through the holes 12 in the base. A stud 14 extends vertically through the base 10 and may be secured thereto by a set screw 16, with the head of the stud projecting below the base 10 for engagement in the usual opening in the compound base or saddle of the lathe, and with the shank of the stud rising axially within a compound spindle comprising lower section 18 and upper section 20.

The lower spindle section 18 has a flange 22 resting on base 10; and screws 24 passing through the flange secure the section 18 to the base. The flange has a series of indexing recesses or holes 26 therein spaced apart equally around the flange, four such holes being represented, corresponding to the number of tool faces or holders on the turret head. Each hole 26 has a conical hollow bushing 28 therein for a purpose which will be described later.

The upper spindle section 20 is pinned to the lower section as at 30, preventing relative rotation; and its body is exteriorly formed with screw threads 32, of relatively long pitch.

The upper end of stud 14 is threaded to receive the nut 34, which, with washer 36 intervening, may be screwed down to clamp the spindle sections 18 and 20 tightly together and to the base 10 and stud 14, thus constituting a rigid compound stud having external screw threads 32.

A turret head 36, with bushing 38 therein, is rotatably mounted on the flanged lower spindle section 18, its under side being formed with an annular counter-bore 40 for receiving the flange 22. A locking bolt 42 is carried by the head, being vertically disposed at a radial distance from the axis of the spindle corresponding to the radial distance from said axis of the series of indexing holes 26 in flange 22 of spindle section 18.

A handle 44 has its hub internally threaded for screwing on the upper spindle section 20, there being a central top recess 46 in the handle for accommodating the nut 34 on stud 14; and a plate 48 for covering this recess.

Under its threaded portion the hub of the handle carries a circular horizontal plate 50, secured to the handle as by the screws 52, which has edge ratchet notches 54 spaced equally around its periphery, equal in number to the number of tool holders on the turret head, four being shown.

Figure 2:
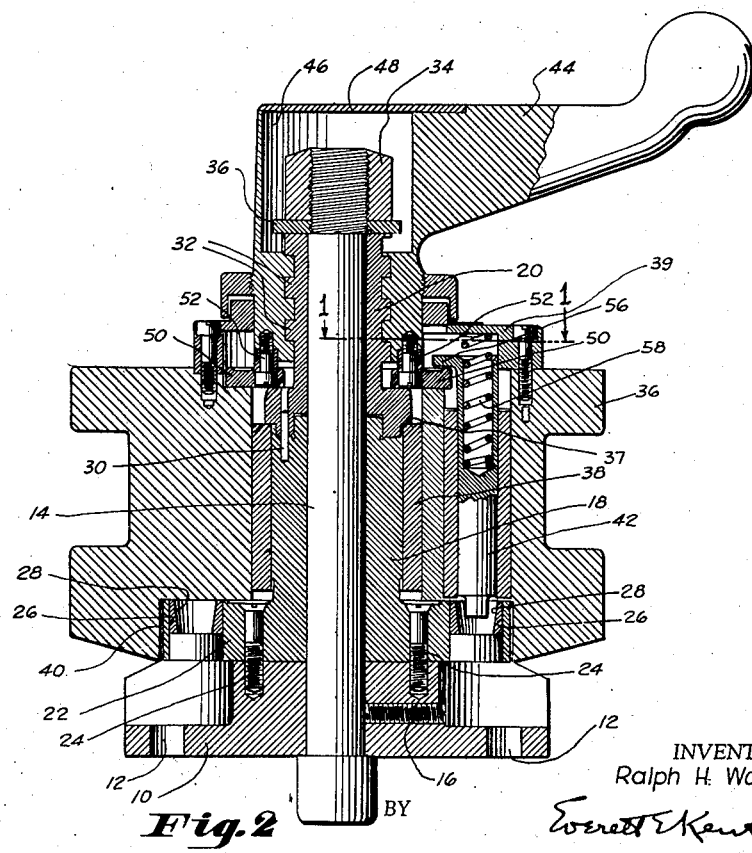
Figure 2 is a side elevation in vertical section on line 2—2 of Figure 1, with the parts in their relative positions when the head is locked.

The locking bolt 42 has a head which spreads laterally toward the axis far enough to overlie the edge part of the plate 50, as seen in Figures 1 and 2; and a spring 58 tends always to keep the bolt's head down against plate 50. When handle 44 is turned, travel of the plate 50 on the screw 32 either lifts that plate and so lifts the bolt 42; or depresses that plate and so lets the bolt descend so far as the bolt is otherwise free to do so.

A pawl 60, mounted on a horizontal pivot 62 in head 36 (Figure 1) beside the locking bolt 42, is adapted to engage any notch 54 of ratchet plate 50, for the plate to rotate the turret head. A spring 64 (Figure 3) continually urges pawl 60 toward this engagement with ratchet plate 50, but a lateral projection 57 (Figure 1) of the head of the locking bolt 42 stands over the tail 61 of the pawl, and prevents such engagement except when the bolt 42 is up.

The lower end of locking bolt 42 is adapted to engage in any of the bushings 28 whose inner conical faces constitute the indexing holes in flange 22, for locking the turret head in any one of its four working positions. The bolt has a sort of chisel shape and taper, with curved edge surfaces, complementary to the internal taper of bushings 28, which permits nice edgewise fit of the bolt taper in each bushing.

Figure 3:
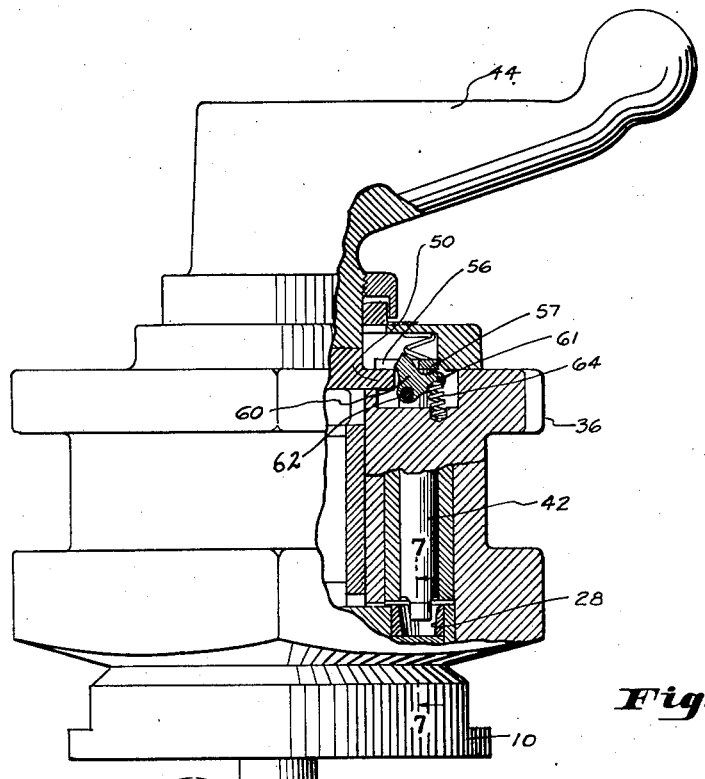
Figure 3 is an elevation similar to Figure 2, but with parts in section on 3—3 of Figure 1, and with other parts, at a lower elevation, in section on the vertical plane of the locking bolt.
Figure 4:
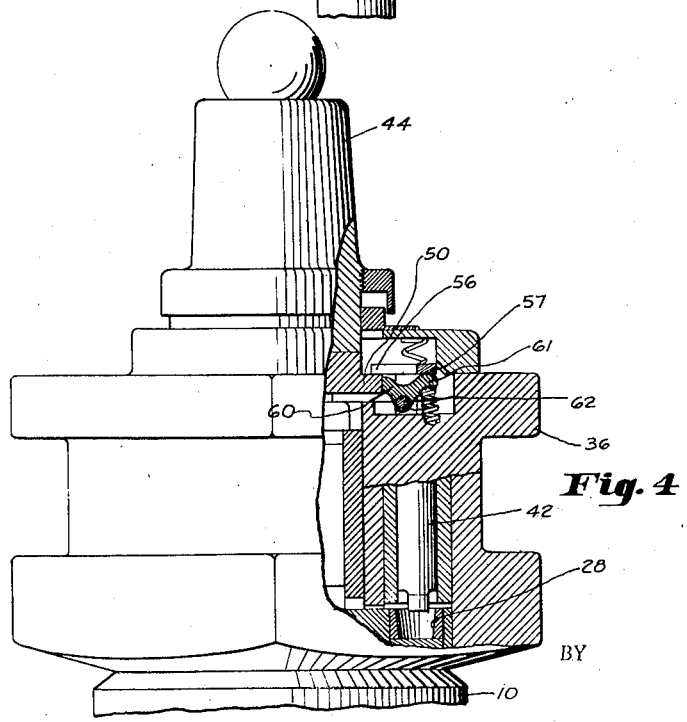
Figure 4 is a view similar to Figure 3, but with the handle moved counter-clockwise through 90° from its position of Figures 2 and 3, and with parts correspondingly moved, including the bolt which is nearly clear of its "keeper"

The turret head is shown locked, in Figures 2 and 3. To rotate the head through 90° to index the next succeeding tool holder in working position, the handle 44 is first moved counter-clockwise through about one-third of a turn. This screws the handle, and the ratchet plate 50 thereon, upward on the coarse threads 32 of spindle section 20. Plate 50, engaging under bolt head 56, carries the bolt upward, against spring 58. Figure 4 shows the bolt at an intermediate position, not quite clear of bushing 28, at a 90° stage of turning of the handle.

In Figure 5 the bolt is shown lifted clear of bushing 28, and in this position the head of the bolt is elevated sufficiently to let pawl 60 engage the notched edge of ratchet plate 50, to which it is urged by its spring 64. The shape of the notches 54, as seen in Figure 1, is such that during counter-clockwise turning of handle 44 a notch can move past the pawl; but during clockwise motion of the handle that notch which first reaches the pawl will engage the pawl so that the turret head will be carried around with the handle.

This clockwise turning of the handle, carrying turret head 36 with it, causes the handle and ratchet plate to ride downward on the screw 32 of spindle 20, thus permitting bolt 42 to be forced down by its spring 58 until the end of the bolt rides on the top surface of flange 22, which it does until the bolt reaches an indexing bushing 28. The snap action of the bolt into that hole 28 swings the pawl 60 clear of the ratchet plate 50, so that propulsion ceases; the entrance of the bolt locks the turret head against rotation; and a further slight clockwise turning of the handle clamps the parts together in the locked position of the head.

As seen in Figure 6, notches 66 in the spindle flange 22 coact with a leaf spring 68 in the turret head constituting a one-way clutch to prevent counter-clockwise turning of the head. This holds the turret stationary while the handle and plate 50 with ratchet move backward, in preparation for seizing the turret for the advancing step.

As seen at 37 in Figure 2, the upper spindle section 20 projects annularly a little over the upper end of bushing 38 of the head. Except when the head is locked and clamped in a particular position, as in Figure 2, the spring 58 tends to lift the turret head, thereby to relieve friction at the flange 22. The shoulder 37 prevents there being any considerable rise.

The use of the turrets of the invention is not limited to lathes, nor are the turrets of the invention necessarily used in the upright, spindle-vertical, position in which the invention is here illustrated, and in which it can with greatest brevity and conciseness be described.

The references to verticality and to upper and lower in the claims will therefore be understood as indicating the relations of the parts to each other, rather than as necessary directions in space.

I claim as my invention:

1. In a machine tool turret having a turret head rotatable on a fixed vertical stud, with a plurality of work faces movable in succession to a work station, the combination with said stud and turret of a handle screw-threaded on an upper part of the stud; a ratchet plate fast with the handle, having a ratchet notch corresponding to each work face on the head, these notches being spaced correspondingly to the faces around the plate; a fixed element with upper surface extending outward from the stud at the lower portion of the stud, the said turret head being mounted between said fixed element and the said ratchet plate; there being recesses in the upper surface of said fixed element constituting keepers arranged in a circle around the axis of the turret and spaced in correspondence to the angular spacing of work faces on the turret head; a locking bolt fitting the recesses, mounted to move up and down, with means urging the bolt downward, in the head at a radial distance from said axis equal to the radius of said circle of keepers; said bolt having a laterally projecting upper part overlying the margin of said ratchet plate, whereby upward travel of that plate lifts the bolt; a pawl mounted in the turret head, having a tail portion beneath a part of the bolt, with means urging the pawl toward engagement with the ratchet notches, the said tail and part of the bolt being at levels permitting that engagement when the bolt has been lifted a predetermined distance, and breaking that engagement when the bolt descends into a keeper recess; the notches in the ratchet plate being of shape to move past the pawl during bolt-lifting screw-rotation of the handle and to engage said pawl with consequent rotatory advance of the turret head during bolt-lowering screw-rotation of the handle.

2. In indexing means for a machine tool turret, in which there are a turret head with a plurality of work faces; a support including a fixed stud about which the head is mounted rotatably for setting the work faces successively at a fixed work station; a spring-pressed bolt for locking the head against rotation; bolt-receiving keeper-recesses located in succession for indexing and locking the head; and a manually operable hub screw threaded on the stud for clamping the head against the support, with pitch long enough for a fractional revolution to effect unclamping and unlocking of the head, and having an annular part, moving with the hub, aligned to engage and withdraw the locking bolt; that combination in which there is a pawl and ratchet connection between the hub and the turret head, arranged to over-ride when the tub turns in unlocking direction, and to rotate the head when the hub turns in locking direction; the said pawl being spring pressed toward the ratchet and being so located relative to the bolt that travel of the bolt in locking direction moves the pawl out of engagement with the ratchet, and travel of the bolt in unlocking direction releases the pawl, permitting its ratchet engagement.

3. In an indexing means for a machine tool turret, in which there are a turret head with a plurality of work faces; a support including a fixed stud about which the head is mounted rotatably for setting the work faces successively at a fixed work station; with rotary indexing means including a hub screw-mounted on the stud, and a thrust bolt for locking the turret against rotation out of an indexed position, and means by which the screwing of the hub withdraws the bolt from and releases it to its locked position, that combination of indexing and locking means in which there is a one-way clutch between the hub and the turret, set for the hub member of the clutch to override the turret member thereof on rotation in unlocking direction, and to rotate the turret when turning in locking direction; and means by which the locking travel of the bolt disconnects the two members of the clutch.

4. A combination for indexing means as in claim 3, in which the said one-way clutch is a ratchet and pawl, the pawl being a lever with fulcrum between its ends, the work end of the lever being for engagement with the ratchet, and the power end being aligned for engagement with the locking means and arranged for locking travel to swing the pawl away from the ratchet.

RALPH H. WALKER.